Oct. 12, 1926.
R. POHL
1,603,210
TEMPERATURE RESPONSIVE DEVICE
Filed April 14, 1925
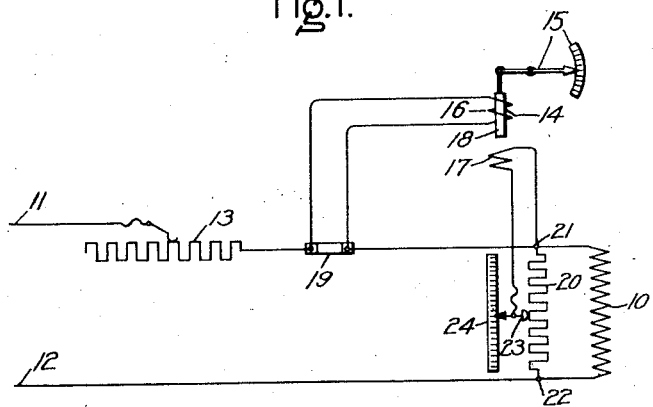
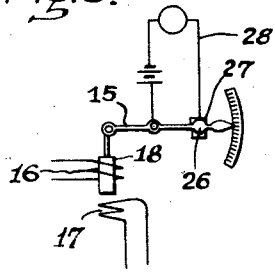
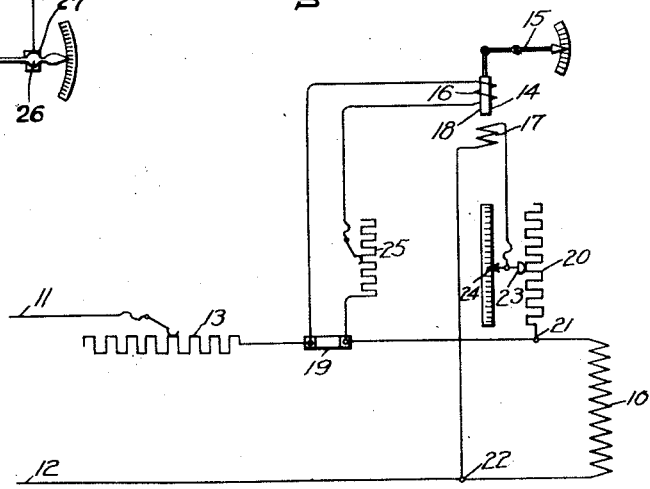
Inventor:
Robert Pohl,
by Alexander D. Lunt.
His Attorney.

Patented Oct. 12, 1926.

1,603,210

UNITED STATES PATENT OFFICE.

ROBERT POHL, OF BERLIN, GERMANY, ASSIGNOR TO GENERAL ELECTRIC COMPANY, A CORPORATION OF NEW YORK.

TEMPERATURE-RESPONSIVE DEVICE.

Application filed April 14, 1925, Serial No. 23,168, and in Germany July 8, 1924.

This invention relates to temperature responsive devices, and more particularly to such devices which are responsive to the variations in the voltage drop of an electrical conductor, such as the windings of an electric machine and the like, due to changes in temperature thereof.

One of the objects of the invention is to provide an improved form of temperature responsive device of the above character which is operable independently of the value of the current in the electric conductor, the variations in the temperature of which are to be determined.

A further object of the invention is to provide a simple and reliable temperature responsive arrangement of the above character which may be electrically connected to the winding of an electrical machine or apparatus and located remotely therefrom to indicate variations in the temperature of the winding.

In carrying the invention into effect in a preferred form, I provide a zero reading indicating instrument having one winding connected to be energized responsively to the voltage drop in the conductor, the variations in temperature of which are to be determined, and a second winding connected to be energized responsively to the current in the conductor. The indicating instrument is arranged so that the indicating pointer is maintained at the zero position when the voltage drop and current in the conductor are in a predetermined relation. The arrangement is such that variations in the voltage drop due to variations of the current in the winding has no effect on the system and only the variations in voltage drop due to temperature changes in the winding effect the operation of the indicating instrument. An adjustable resistance is arranged to control one of the windings, preferably the winding energized responsively to the voltage drop in the conductor, in order to return the indicating pointer to the zero position when the current and voltage drop vary from the predetermined relation, due to temperature variations in the winding. Thus, when the regulating resistance is varied so that the pointer of the indicating instrument is returned to the zero position, the change in resistance required to bring the pointer to the zero position will correspond to the change in voltage drop in the winding due to variation in the temperature thereof. The regulating resistance can, therefore, be provided with a pointer and scale mechanism calibrated in temperature degrees so as to directly indicate the variation in temperature of the conductor.

For a better understanding of my invention reference is had to the following description taken in connection with the accompanying drawings which illustrate two modifications of my invention for the purpose of explaining the principles thereof. In the drawing, Fig. 1 is a schematic diagram of a temperature indicating arrangement embodying the invention and Fig. 2 is a modification of the arrangement shown in Fig. 1. Fig. 3 is a view of a modified form of indicating instrument adapted to operate a relay.

As shown in Fig. 1 the electrical conductor 10, which may be assumed to be the field winding of an electrical machine of which the temperature is to be determined, is arranged to be supplied with current from suitable supply lines 11 and 12 with a variable resistor 13 in circuit therewith. In the temperature responsive arrangement shown, a zero reading indicating instrument 14, having a pointer and scale mechanism 15 is provided with a pair of operating windings 16 and 17 which are arranged to jointly control the magnetic member 18 attached to the pointer of the indicating mechanism 15. The windings 16 and 17 are arranged to act in opposition upon the magnetic member 18. The winding 16 is arranged to be energized responsively to the current in the conductor 10 through the agency of a suitable shunt 19 as indicated in the drawing or by other suitable means. The winding 17 is arranged to be energized responsively to the voltage drop in the conductor 10 by means of a resistor 20 connected to the terminals 21 and 22 of the conductor 10, and hence in parallel circuit therewith. The winding 17 is connected to a variable portion of the resistor 20 by means of a sliding contact 23, which is provided with a pointer and scale mechanism 24.

When the conductor 10 is energized from the supply lines 11 and 12, variations in the temperature of the conductor are determined in the following manner. The sliding contact 23 is adjusted to control the energization of the winding 17 so that when the current and voltage drop in the conductor are in a predetermined relation the effects of the windings 16 and 17 upon the magnetic member 18 are equal and opposite, and thus maintain the member 18, together with the pointer 15, in a predetermined position, which preferably is the zero position of the pointer and scale mechanism 15. The arrangement preferably is such that the current in the conductor 10 may be varied to a desired value by operating the variable resistor 13 without in any way disturbing the balanced effect of the windings 16 and 17 upon the magnetic member 18. This may be accomplished since variation of the current in the conductor 10 simultaneously changes the energization of the winding 17, as well as the winding 16.

However, if the temperature of conductor 10 is gradually increased due to the heating effect of the current conducted therethrough or from any other cause, the ohmic resistance of the winding is correspondingly increased an amount depending upon the coefficient of resistance of the material of which the conductor 10 is formed. Hence the voltage drop in the conductor 10 likewise is increased and this causes a correspondingly increased energization of the winding 17. The resulting unbalancing of the effects of windings 16 and 17 upon magnetic member 18 carries the pointer of indicating mechanism 15 away from the zero position. If now the sliding contact 23 is adjusted to restore the balance between the windings 16 and 17 so as to return the pointer 15 to the zero position, the change in the regulating resistor 20 required to bring the pointer to the zero position will be a measure of the increase in temperature of the conductor 10. Thus the pointer and scale mechanism 24 may be calibrated in temperature degrees, in order that the variation in temperature in the conductor 10 may be directly indicated thereupon.

In the modified arrangement shown in Fig. 2 the various elements of the temperature responsive arrangement are constructed and arranged in substantially the same manner as described in connection with Fig. 1 except that a variable portion of the regulating resistor 20 is arranged to be connected in series with the winding 17 to the terminals 21 and 22 of the conductor 10, of which the temperature is to be determined. The arrangement shown in Fig. 2 operates in exactly the same manner as previously described in connection with Fig. 1, and hence the pointer and scale mechanism 24 associated with sliding contact 23 directly indicates the variation in temperature of the conductor 10.

If desired, the temperature responsive arrangement shown in either Fig. 1 or Fig. 2 may be employed to operate protective devices such as, for example, alarm devices or automatic circuit interrupters, after a predetermined variation in the temperature of the conductor 10 is attained. For this purpose as indicated in Fig. 3 the movable pointer of the indicating device 14 is provided with a circuit controlling contact 26 which is arranged to engage contact 27 and thereby close the auxiliary alarm or automatic circuit interrupter trip circuit 28 when the pointer is in the zero position. Thus by preadjusting the sliding contact 23 to a certain temperature so as to unbalance the effects of the windings 16 and 17 upon the magnetic member 18, magnetic member 18 will return the pointer 16 to the zero position when the variation in the temperature of the conductor 10 reaches the value for which the sliding contact 23 has been preadjusted, and thereby effect engagement of the contacts 26 and 27 to close the auxiliary alarm or automatic circuit interrupter trip circuit 28.

With the present invention the indicating instrument 14 may be of the magnetic vane type, although other forms of indicating instruments which respond to the differential action of two opposing windings may be employed if desired.

In order to eliminate the effects of temperature change in the temperature responsive apparatus, the regulating resistor 20, as well as the windings 16 and 17, preferably are formed of material having a practically negligible temperature coefficient. Also a variable resistor 25 may be connected in the energizing circuit of winding 16 if desired in order that the variation in temperature of any conductor independently of its resistance may be determined.

In accordance with the provision of the patent statutes I have described the principle of operation of my invention, together with the apparatus which I now consider to represent the best embodiment thereof, but I would have it understood that the apparatus shown is only illustrative and that the invention may be carried out by other means.

What I claim as new and desire to secure by Letters Patent of the United States, is:

1. Means responsive to variations in the temperature of an electric conductor comprising a winding electrically connected with the conductor to be energized responsively to the voltage drop of the conductor, a movable member operable under the control of said winding, and electro-responsive means associated with the conductor and cooperating with said winding to insure operation of said movable member responsively to variations in the voltage drop of the conductor due to changes in the temperature thereof independently of changes of the current in the conductor.

2. Means responsive to variations in the temperature of an electric conductor comprising a winding electrically connected with the conductor to be energized responsively to the current in the conductor, a second winding electrically connected with the conductor to be energized responsively to the voltage drop of the conductor, and a movable member operable under the joint control of said windings and arranged to be maintained in a predetermined position when the current and voltage drop in the said conductor are in a predetermined relation and to be operated from said position when the voltage drop of the conductor varies from said relation responsively to variations in the temperature of the conductor.

3. Means responsive to variations in the temperature of an electric conductor comprising a movable member, a pair of windings arranged to act in opposition upon said member, and connections through which one of said windings is energized responsively to the current in said conductor and the other of said windings is energized responsively to the voltage drop of said conductor, said windings being coordinated to maintain the said member in a predetermined position when the current and voltage drop in said conductor are in a predetermined relation and to operate the said member from said position when the voltage drop of the conductor varies from said relation responsively to variations in the temperature of the conductor.

4. Means responsive to variations in the temperature of an electric conductor comprising a movable member, a pair of windings arranged to act in opposition upon said member, connections through which one of said windings is energized responsively to the current of the conductor and the other of said windings is energized responsively to the voltage drop in the conductor, said windings being arranged in cooperating relation to maintain said member in a predetermined position when the current and voltage drop in said conductor are in a predetermined relation, and means for controlling the energization of one of said windings to return the said member to said predetermined position upon variation of the voltage drop in the conductor responsively to variations in the temperature of the conductor.

5. Means responsive to variations in the temperature of an electric conductor comprising a movable member, a pair of windings arranged to act in opposition upon said member, connections through which one of said windings is energized responsively to the current in the conductor and the other of said windings is energized responsively to the voltage drop in the conductor, said windings being arranged to exert equal and opposite effects upon said member when the current and voltage drop in said conductor are in a predetermined relation, and means for balancing the effects of said windings upon said member when the voltage drop in the conductor varies from said predetermined relation responsively to variations in the temperature of the conductor.

6. Means responsive to variations in the temperature of an electric conductor comprising a movable member, a winding electrically connected with the conductor to be energized responsively to the current in the conductor, a second winding electrically connected with the conductor to be energized responsively to the voltage drop in the conductor, said windings being arranged in operative relation with said movable member to exert an equal and opposite effect upon said member when the current and voltage drop in said conductor are in a predetermined relation, and means including a resistor in circuit with one of said windings for balancing the effects of said windings upon said member when the voltage drop in the conductor varies from said predetermined relation responsive to variations in the temperature of the conductor.

7. A device for measuring variations in the temperature of an electric conductor comprising a movable member, a pair of windings arranged to act in opposition upon said member, one of said windings being connected in circuit with the conductor to be energized responsively to the current in the conductor and the other of said winding being connected in circuit with the conductor to be energized responsively to the voltage drop in the conductor, said windings being disposed in cooperating relation with said movable member to maintain said member in a predetermined position when the current and voltage drop in said conductor are in a predetermined relation, and means including a movable indicating element for controlling the energization of one of said windings to return the member to said predetermined position upon variation of the voltage drop in the conductor from said predetermined relation responsively to variation in the temperature of the conductor.

8. A device for determining the variations in the temperature of an electric conductor comprising a movable member, a winding electrically connected to be energized responsively to the current in the conductor, a second winding electrically connected to be energized responsively to the voltage drop in the conductor, said windings being disposed in cooperating relation with said movable member to exert equal and opposite effects upon said movable member to maintain the member in a predetermined position when the current and voltage drop in said conductor are in a predetermined relation and to operate said member from said position responsively to variations in the relation between the current and voltage drop in said conductor, and means including a variable resistor having an indicating element for controlling the energization of one of said windings to return the said member to said predetermined position upon variation of the voltage drop in the conductor from said relation responsively to variations in the temperature of the conductor.

9. A device for indicating variations in the temperature of an electric conductor comprising a movable magnetic member, a pair of windings arranged to act in opposition upon said member, means for energizing one of said windings responsively to the current in the conductor, means including a variable resistance for energizing the other of said windings responsively to the voltage drop in the conductor, said variable resistor means being operable to balance the effects of said windings upon said member when the current and voltage drop in said conductor are in one relation, and an indicating device associated with said resistor for indicating the variation thereof required to balance the effects of said windings upon said member when the current and the voltage drop in said conductor are in a different relation due to variations in the temperature of the conductor.

10. A device for indicating the variations in the temperature of an electric conductor, comprising a pointer and scale mechanism, electro-responsive means comprising a movable magnetic member, and a pair of windings arranged to act in opposition upon said member for controlling the relative movement between said pointer and said scale, means for energizing one of said windings responsively to the current in the said electric conductor, means including a variable resistor having a pointer and scale mechanism associated with the movable element thereof for energizing the other of said windings responsively to the voltage drop in said conductor, said variable resistor means being operable to vary the effects of said second winding upon said magnetic member to operate said pointer to a predetermined position when the current and the voltage drop in the conductor are in different predetermined relations due to variations in the temperature of the conductor.

In witness whereof I have hereunto set my hand this 27th day of March 1925.

ROBERT POHL.